United States Patent
Rosner et al.

(10) Patent No.: US 6,636,968 B1
(45) Date of Patent: Oct. 21, 2003

(54) MULTI-NODE ENCRYPTION AND KEY DELIVERY

(75) Inventors: Martin Rosner, Hastings-On-Hudson, NY (US); Michael A. Epstein, Spring Valley, NY (US); Michael S. Pasieka, Thornwood, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/434,156

(22) Filed: Nov. 4, 1999

Related U.S. Application Data
(60) Provisional application No. 60/126,168, filed on Mar. 25, 1999.

(51) Int. Cl.$^7$ .................................................. G06F 1/24
(52) U.S. Cl. ........................ 713/178; 713/200; 713/201
(58) Field of Search ................................. 713/171, 178, 713/179, 200, 201

(56) References Cited

U.S. PATENT DOCUMENTS

| | | | |
|---|---|---|---|
| 5,218,638 A | 6/1993 | Matsumoto et al. | 380/23 |
| 5,796,830 A | 8/1998 | Johnson et al. | 380/21 |

FOREIGN PATENT DOCUMENTS

| | | | |
|---|---|---|---|
| EP | 0810754 A1 | 5/1997 | H04L/9/08 |
| GB | 2308282 | 12/1996 | H04L/9/28 |

OTHER PUBLICATIONS

Schneier "Applied Cryptography", Wiley and Sons, Inc., second edition, sec. 3.3, 3.4, 3.5.*

* cited by examiner

Primary Examiner—Thomas R. Peeso
(74) Attorney, Agent, or Firm—Daniel J. Piotrowski

(57) ABSTRACT

The common encryption of content material is provided for decryption at a plurality of destination devices, each destination device having a unique private key of a public-private key pair. A multiple device key exchange is utilized to create a session key for encrypting the content material that is based on each of the public keys of the plurality of destination devices. The content material is encrypted using this session key. A partial key is also created for each of the intended destination devices that relies upon the private key of the destination device to form a decryption key that is suitable for decrypting the encrypted content material. The encrypted content material and the corresponding partial key are communicated to each destination device via potentially insecure means, including broadcast over a public network. Each destination device decrypts the encrypted content material using the decryption key that is formed from its private key and the received partial key. Including or excluding the public key of selected destination devices in the creation of the session key effects selective encryption.

19 Claims, 5 Drawing Sheets

MULTI-NODE ENCRYPTION AND KEY DELIVERY

This application claims the benefit of U.S. Provisional Application No. 60/126,168 filed Mar. 25, 1999, Attorney Docket PHA-23, 638P.

BACKGROUND OF THE INVENTION

1. Field of the Invention

This invention relates to the field of communications systems, and in particular to the encryption of information for distribution to multiple recipients

2. Description of Related Art

Cryptographic systems are commonly used to encrypt sensitive or confidential information, and increasingly, to encrypt copy-protected material, such as copyright audio and video material. Generally, the content information is encrypted by a source device and communicated over a communications path to a destination device, where it is decrypted to recreate the original content material. The source device encrypts the material using an encryption key, and the destination device decrypts the material using a decryption key. A symmetric cryptographic system uses the same key to encrypt and decrypt the material; an asymmetric cryptographic system uses one of a pair of keys for encryption, and the other of the pair for decryption. Most cryptographic systems are based on the premise that the expected computation time, effort, and costs required to decrypt the message without a knowledge of the decryption key far exceeds the expected value that can be derived from such a decryption.

Often, a key-exchange method is employed to provide a set of encryption and decryption keys between a source and destination device. One such key-exchange system is the "Diffie-Hellman" key-exchange algorithm, common in the art. FIG. 1 illustrates an example flow diagram for a key-exchange and subsequent encryption of content material using the Diffie-Hellman scheme. At 110, a source device, device S, transmits a large prime n, and a number g that is primitive mod n, as a message 111 to a destination device, device D, that receives n and g, at 115. Each device, at 120 and 125, generates a large random number, x and y, respectively. At 130, device S computes a number X that is equal to $g^x$ mod n; and, at 135, device D computes a number Y that is equal to $g^y$ mod n. Device S communicates X to device D, and device D communicates Y to device S, via messages 131, 136, respectively. The numbers X and Y are termed public keys and the numbers x and y are termed private keys. Note that the determination of x from a knowledge of g and X, and y from a knowledge of g and Y, is computationally infeasible, and thus, an eavesdropper to the exchange of g, n, and the public keys X and Y will not be able to determine the private keys x or y.

Upon receipt of the public key Y, the source device S computes a key K that is equal to $Y^x$ mod n, at 140, and the destination device D computes a key K' that is equal to $X^y$ mod n, at 145. Note that both K and K' are equal to $g^{xy}$ mod n, and thus both the source S and destination D devices have the same key K, while an eavesdropper to the exchange of g, n, X, and Y will not know the key K, because the eavesdropper does not know x or y.

After effecting the key-exchange, the source device S encrypts the content material M 150 and communicates the encrypted material $E_K(M)$ to destination device D, at 160, via communications path 161. Because device D's key K' is identical to the key K that is used to encrypt the content material M 150, device D uses key K' to decrypt the received encrypted material $E_K(M)$ to create a decrypted copy 150' of the content material M 150, at 165. This encryption method is referred to as symmetric because both devices use the same key K, K' to encrypt and decrypt the content material M 150. An eavesdropper to the communications path 161, not having knowledge of the key K, is unable to decrypt the encrypted material $E_K(M)$, and thus unable to create a copy of the content material M 150. Note that the source device S need not communicate its public key X to the destination device D until the key X is needed by the destination device D to create the decryption key K, and therefore the public key X is often included as an attached item to the content material. In this manner, a destination device need not maintain a record of each of the source devices with which it has exchanged keys. The destination device D creates the decryption key by raising the attached public key X' to the power of its private key y, and applies it to the received encrypted material. X' represents a public key of an arbitrary source device. Provided that the material was encrypted using the destination device's public key Y and the source device's private key x' corresponding to the attached public key X', the determined decryption key, $(X')^y$ mod n at the destination device D will appropriately decrypt the material. The source device S can continue to encrypt other content material using the key K for communication to the destination device D, as required, without repeating the above key-exchange.

For device S to communicate encrypted information to another device, a similar key-exchange process is performed with the other device. Device S transmits its public key X, and receives a public key Z that is equal to $g^z$ mod n, where z is the private key of the other device. The new encryption/decryption key K is then computed by device S and the other device as $g^{xz}$ mod n, and this key is used to encrypt information from device S to the other device, and vice versa.

The source device S may keep a record of the appropriate key to use for communicating to each destination device, so that a key-exchange need not be repeated for each communication. It is also common practice to re-establish a new key between the source device and destination device at regular time intervals, to improve the security of the system. If the same content material is to be communicated from source device S to two destination devices, device S encrypts the content material using the key associated with the first destination device, then encrypts the content material using the key associated with the second destination device. If the content material is intended for three destination devices, three unique copies are required, and so on. This requirement of multiple copies for multiple destinations incurs a substantial overhead in terms of processing time and memory resources to encrypt the material, and additional communication time or bandwidth to communicate the information to each destination device.

BRIEF SUMMARY OF THE INVENTION

It is an object of this invention to provide a common encryption of content material that can be decrypted by multiple devices, each device having a unique private key. It is a further object of this invention to provide a multiple device key-exchange that facilitates a common encryption of content material for decryption by each device. It is a further object of this invention to provide a multiple device key-exchange that facilitates a common encryption of content material for selective decryption by one or more of the devices. It is a further object of this invention to minimize the computation requirements at a destination node for a multiple device key exchange.

These objects and others are achieved by creating a session key for encrypting content material that is based on each of the public keys of a plurality of destination devices. A partial key is also created corresponding to each of the destination devices that relies upon a private key associated with each destination device to form a decryption key that is suitable for decrypting content material that is encrypted by the session key. The encrypted content material and the corresponding partial key are communicated to each destination device. Each destination device decrypts the encrypted content material using the decryption key that is formed from its private key and the received partial key. Including or excluding the public key of selected destination devices in the creation of the session key effects selective encryption.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions.

DETAILED DESCRIPTION OF THE INVENTION

Figure 1:
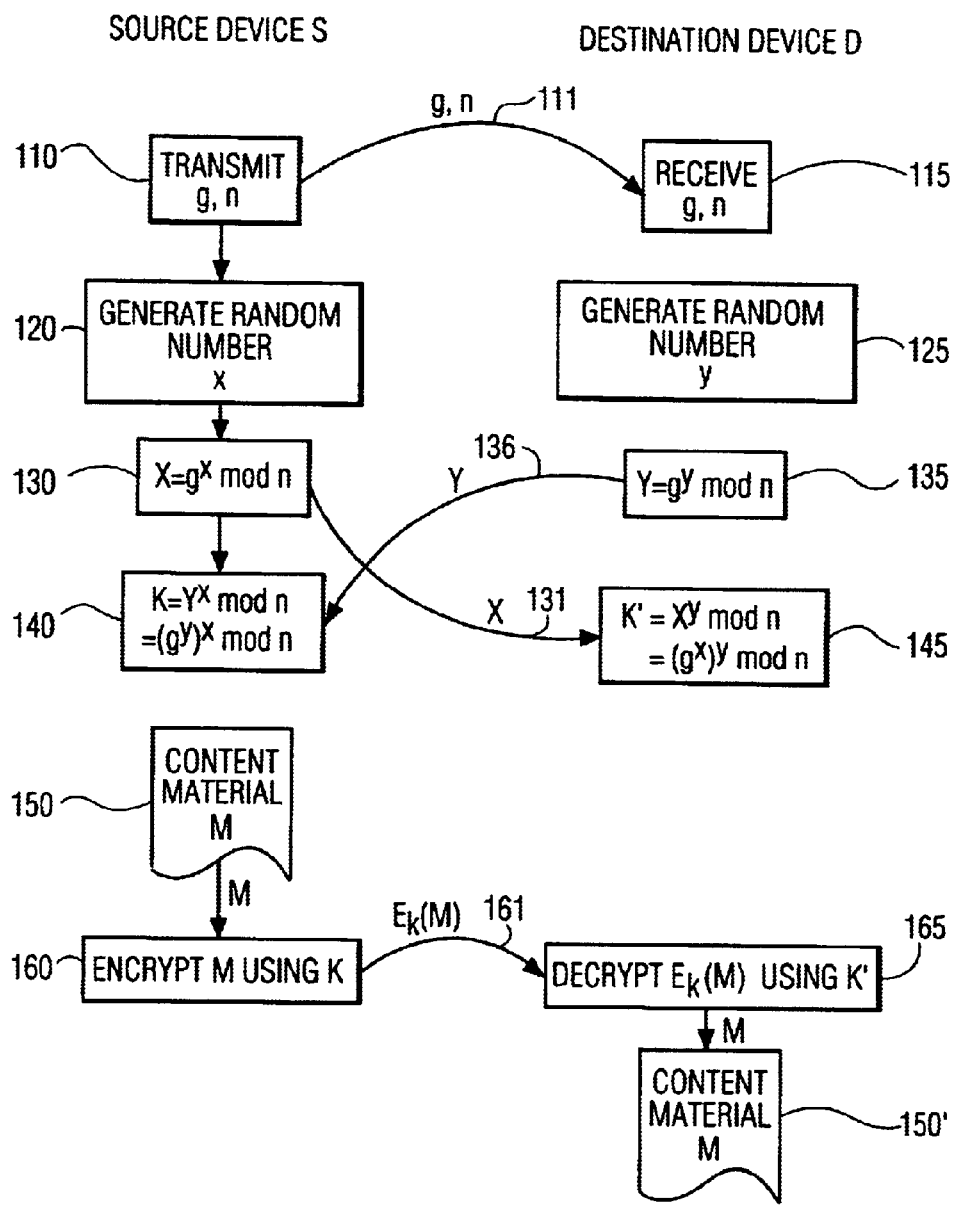
FIG. 1 illustrates an example prior art key-exchange between a source and destination device.
Figure 2:
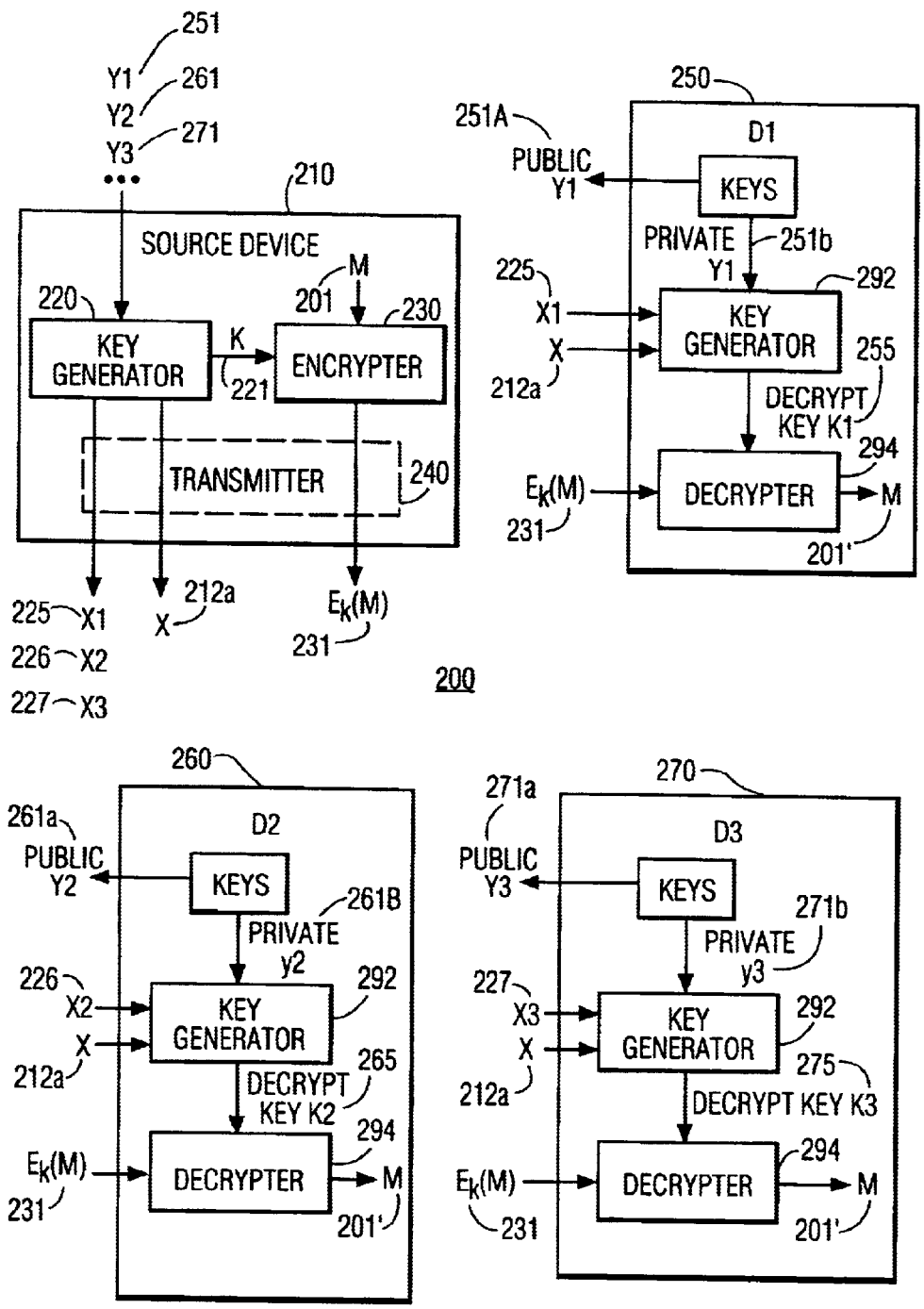
FIG. 2 illustrates an example block diagram of an encryption and decryption system in accordance with this invention.

FIG. 2 illustrates an example block diagram of an encryption and decryption system 200 in accordance with this invention. A source device 210 includes a key generator 220 that generates a session key K 221 that is used by an encrypter 230 to encrypt content material 201 to form encrypted content material 231. The session key 221 is based upon a secret key x of the source device 210, and public keys 251a, 261a, 271a, etc. from destination devices 250, 260, 270, etc. The key generator 220 also generates partial keys 225, 226, 227, etc. that facilitate the decryption of the encrypted content material 231 at each of the destination devices 250, 260, 270, etc. The partial keys 225, 226, 227, etc. are created such that a knowledge of the private key 251b, 261b, 271b, etc. of each corresponding destination device 250, 260, 270, etc. and a knowledge of a common group key X 212a facilitates a determination of a decryption key 255, 265, 275, etc. that is suitable for decrypting the encrypted content material 231. The partial keys 225, 226, 227, etc. are communicated to each corresponding destination device, and are used by each destination device to decrypt the encrypted content material 231. Commonly available techniques may be utilized to communicate this information (225–227, 212a, 231), without risk of compromising the security of this system. The information (225–227, 212a, 231) may be communicated independently or as a composite block; the key generator 220 and the encrypter 230 may each provide a transmission means, or a discrete transmitter 240 may be provided. Because the communication paths need not be secure, any number of communication techniques, common in the art, may be utilized. For ease of understanding and illustration, the other components used to effect the communication of information to and from the source and destination device, being common in the art, are not illustrated in the accompanying figures.

The key generator 292 in each decryption device 250, 260, 270, etc. combines its private key 251b, 261b, 271b to the public group key X 212a and the partial key 225, 226, 227 respectively to produce a corresponding decryption key K1 255, K2 265, K3 275. The decrypter 294 in each device 250, 260, 270 applies the corresponding decryption key K1 255, K2 265, K3 275 to the encrypted content material $E_k(M)$ 231 to reproduce the original content material M 201' when the decryption key K1, K2, K3 matches the original encryption key K 221. That is, in accordance with this invention, a session key is created that is based on a composite of the public keys of each of the intended destination devices, and a group key and partial keys are created that, when appropriately combined with a corresponding private key, provide a decryption key corresponding to the session key. For example, the partial key 225 and public group key 212a contain sufficient information to create a decryption key by appropriately applying the private key 251b of destination device 250. The partial key 225 and public group key 212a suitably encoded such that a lack of knowledge of the private key 251b precludes an efficient determination of the decryption key 255.

By supplying a partial key and group key that can be combined with a private key of each destination device to form a decryption key, the same encryption of content material can be distributed to multiple destination devices, each destination device receiving the appropriate partial key corresponding to its particular private key.

Figure 3:
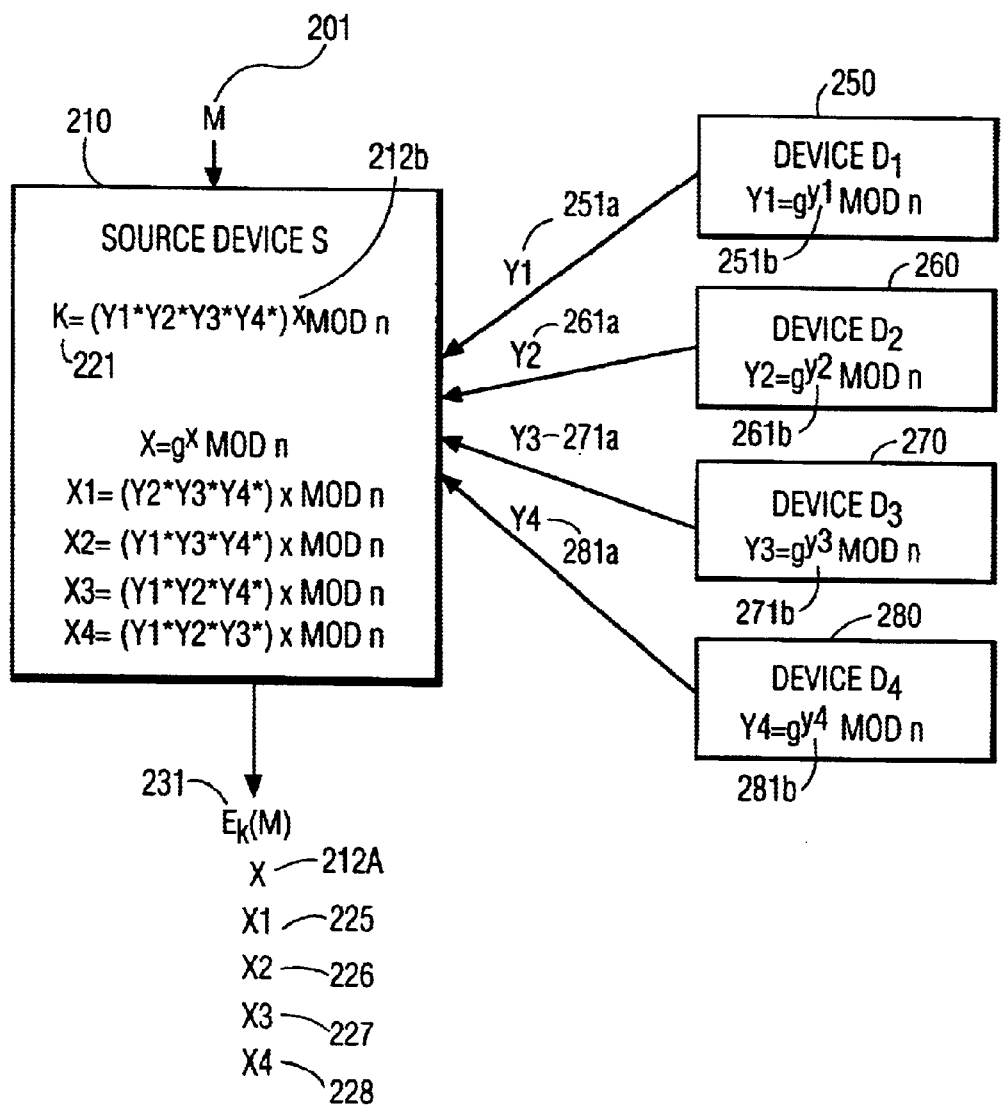
FIG. 3 illustrates an example key-exchange between a source and multiple destination devices in accordance with this invention.

FIG. 3 illustrates an example key-exchange between a source and multiple destination devices that facilitates the generation of a common session key 221, a group key 212a, and multiple partial keys 225–228 in accordance with this invention. In this example illustration, each destination device D1 250, D2 260, D3 270 and D4 280 generate public keys Y1 251a, Y2 261a, Y3 271a and Y4 281a using the conventional Diffie-Hellman equation $g^y$ mod n, where y is the corresponding private key of each destination device (y1 251b, y2 261b, y3 271b, and y4 281b). As is common in the art, for improved security, g is preferably a global finite field generator, and n is a global prime in the same group as g.

The source device 210 creates a session key K 221 that is a composite of each of the public keys Y1 251a, Y2 261a, Y3 271a and Y4 281a, using a variant of the Diffie-Hellman technique: $(Y1*Y2*Y3*Y4)^x$ mod n, where x is the private key 212b of the source device 210, preferably chosen at random. The session key K 221 is used to encrypt content material M 201 that is distributed to each of the destination devices D1 250, D2 260, D3 270 and D4 280. To facilitate the decryption of this common encrypted material $E_k(M)$ 231, the source device 210 creates partial keys 225–228 and a public group key X 212a. Each partial key X1 225, X2 226, X3 227, and X4 228 in this example embodiment is of the form $$Xj = \left( \prod_{i=1}^{k} Y_i, i \neq j \right)^x \mod n \qquad (1)$$

where k is the number of destination devices. That is, the partial key of each destination device is a composite of each of the public keys of the other destination devices raised to the power of the private key x 212b associated with the source device, modulo n. The group key X 212a is computed by the source device 210 by raising the common and public value g to the power of the private key x 212b associated with the source device 210, modulo n, and is also referred to as the public key of the source device 210.

Figure 4:
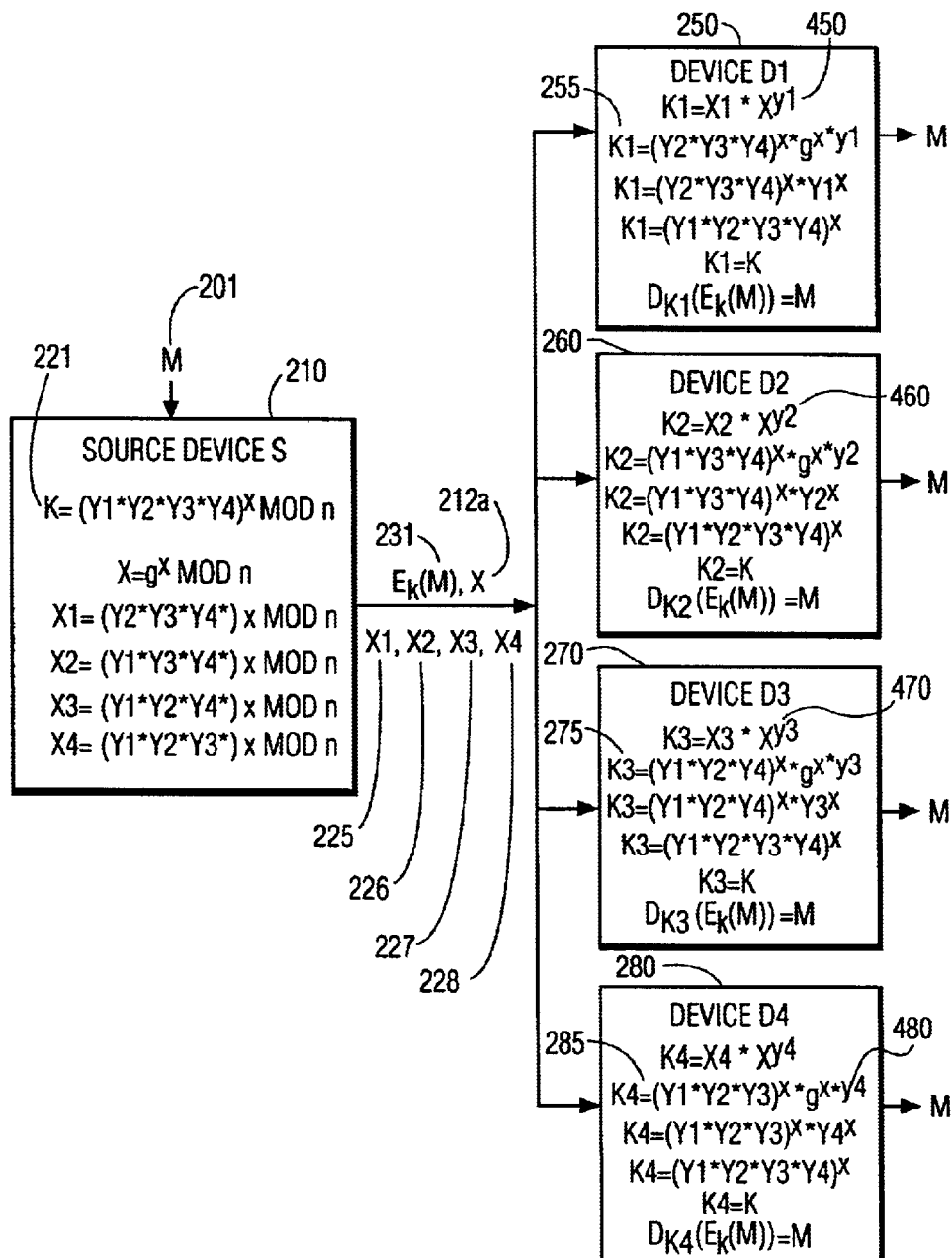
FIG. 4 illustrates an example common encryption and multiple decryption in accordance with this invention.

FIG. 4 illustrates an example common encryption and multiple decryptions in accordance with this invention. In a preferred embodiment of this invention, the commonly encrypted material $E_k(M)$ 231, the group key X 212a of the source device 210, and each of the partial keys 225–228 are communicated to each of the destination devices 250, 260, 270, and 280. Note that these communications may occur via a public communications channel. Each destination device creates a sub-key using the conventional Diffie-Hellman form $X^y$ mod n, where X is the public, or group, key 212a of the source device, and y is the corresponding private key of each destination device. That is, for example, the sub-key 450 of destination device D1 250 is $X^{y1}$ mod n, the sub-key 460 of destination device D2 260 is $X^{y2}$ mod n, and so on.

Each destination device 250, 260, 270, 280 forms a decryption key 255, 265, 275, 285 by forming the product of its corresponding partial key 225, 226, 227, 228 and its sub-key 450, 460, 470, 480. As illustrated in FIG. 4, because each sub key $X^y$ mod n is equivalent to $Y^x$ mod n (because $(g^x)^y$ mod n=$(g^y)^x$ mod n), the product of each partial key with each sub-key is equivalent to the session key K 221, $(Y1*Y2*Y3*Y4)^x$ mod n, and thus the decryption keys 255, 265, 275, 285 are each equal to the session key K 221 that was used to encrypt the content material M 201. Each destination device uses the derived decryption key 255, 265, 275, 285 to decrypt the commonly encrypted content material $E_K(M)$ 231 to provide the content material M.

Note that the session key K 221 is based upon the public key of each of the destination devices that are intended to decrypt the encrypted content material $E_k(M)$ 231. This provides a method for selectively including or excluding one or more of the destination devices for authorized decryption.

Figure 5:
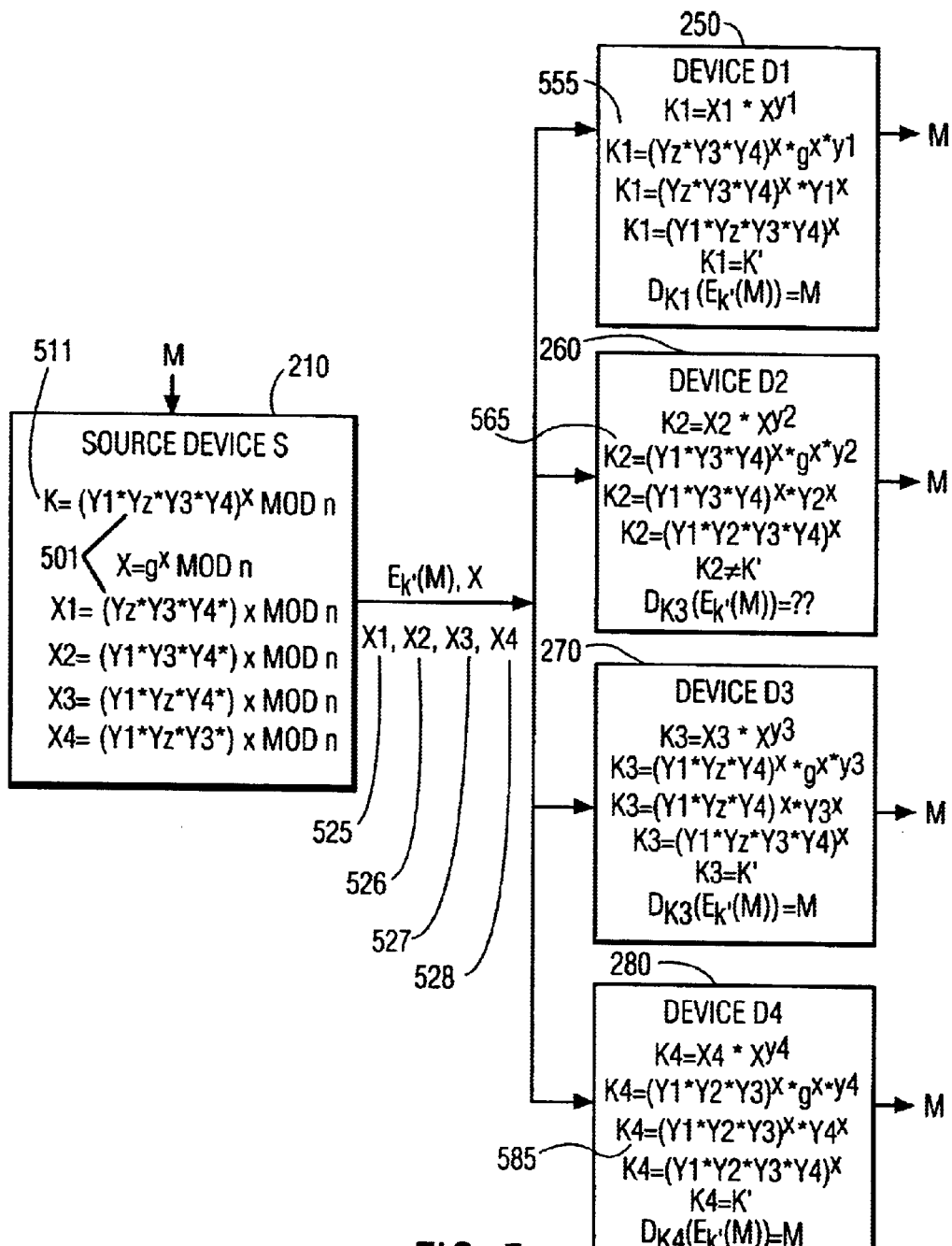
FIG. 5 illustrates an example selective encryption and multiple decryption in accordance with this invention.

FIG. 5 illustrates an example selective encryption and multiple decryption in accordance with this invention. The example encryption at the source device 210 utilizes the public keys Y1, Y3, and Y4 of devices D1, D3, and D4, but not the public key Y2 of device D2. In the example encryption of FIG. 5, the public key Y2 261a of FIG. 3 is replaced in the creation of the session key K' 511 and each of the partial keys 525–528 by a "dummy" or "placeholder" public key Yz 501. The content material M is encrypted by this session key K' 511 that is equal to $(Y1*Yz*Y3*Y4)^x$ mod n to produce an encrypted content $E_{k'}(M)$ 531.

When each of the devices D1, D3, and D4 form the product of its sub-key and its partial key 525–528, the corresponding decryption key 555, 575, 585 is computed to be equal to $(Y1*Yz*Y3*Y4)^x$ mod n, the session key K' 511. Device D2, on the other hand, forms the product of its sub-key $X^{y2}$ mod n (which is equal to $Y2^x$ mod n) with its partial key $(Y1*Y3*Y4)^x$ mod n, and forms a decryption key that is equal to $(Y1*Y2*Y3*Y4)^x$ mod n. Note that this determined key $(Y1*Y2*Y3*Y4)^x$ mod n is not equal to the session key K' $(Y1*Yz*Y3*Y4)^x$ mod n that was used to encrypt the content material M, and therefore device D2 260 is unable to render the content material M.

This selective exclusion of destination devices can be extended to multiple destination devices by replacing each of the excluded destination device's public keys with a placeholder key 501 in the generation of the session key and each partial key. The placeholder key 501 can be any value except zero.

The foregoing merely illustrates the principles of the invention. It will thus be appreciated that those skilled in the art will be able to devise various arrangements which, although not explicitly described or shown herein, embody the principles of the invention and are thus within its spirit and scope. For example, different session keys can be defined by regenerating the public keys associated with each destination device by utilizing a different seed value g at each session. In like manner, the number of destination devices can be increased by adding the new destination device to the network 200 of communicating devices and regenerating a session key corresponding to the inclusion of the new destination device. Preferably, a different seed value g is used for such a new generation of keys, because if the same seed value g is used, the partial key corresponding to the new destination device may correspond to the session key of an encryption before the new destination device is added to the network 200. That is, for example, the partial key for a fifth destination device in the example of FIG. 4 will be $(Y1*Y2*Y3*Y4)^x$ mod n, which is the session key K 211 for the four-destination-device network of FIG. 4. However, if the public keys Y1, Y2, etc. are different for each network configuration, such a problem does not arise. Alternatively, upon network reconfiguration in association with additional destination devices, the source device can securely assign a new value to its private key x 212b. Such action will cause all subsequent session K keys, partial X1, X2, etc. keys, and group X keys to be distinct from previous session, partial, and group keys. A combination of these approaches may also be employed.

Note that other encryption techniques, common in the art, may be applied to further enhance the security of the system. For example, the "station-to-station" protocol of ISO 9798-3 is commonly used to prevent a "man-in-the-middle" attack on a Diffie-Hellman key exchange. In like manner, the station-to-station protocol of ISO 9798-3 may also be employed to prevent a man-in-the-middle attack on a key-exchange in accordance with this invention.

The example embodiments of the figures are provided for illustration purposes. Alternative embodiments are also feasible. For example, each destination device need not be unique. A family of destination devices may all have the same private key, and the encryption method is structured to provide secure communications to a family of devices rather than a single device. In such an embodiment, the techniques of this invention can be utilized to distribute material to a plurality of families of devices. Similarly, the techniques presented in this invention may be combined with other security techniques as well. For example, time-dependent encryptions, limited copy encryptions, and so on may also utilize this multiple-destination distribution technique. These and other system configuration and optimization features will be evident to one of ordinary skill in the art in view of this disclosure, and are included within the scope of the following claims.

We claim:

1. A method for encrypting content material for decryption by a plurality of destination devices, each destination device of the plurality of destination devices having a private key and a public key of a public-private key pair, the method comprising:

creating a session key based on a combination of each public key corresponding to each destination device, creating a plurality of partial keys corresponding to the plurality of destination devices, each partial key being configured to provide a decryption key corresponding to the session key when combined with the private key of each corresponding destination device and a public group key, encrypting the content material based on the session key to create encrypted content material, and communicating the encrypted content material to at least one destination device with at least one partial key that corresponds to the at least one destination device.

2. The method of claim 1, wherein the partial key of each destination device includes a product of each public key corresponding to each other destination device of the plurality of destination devices.

3. The method of claim 1, wherein each partial key is dependent upon a source device private key corresponding to the public group key.

4. The method of claim 3, wherein the partial key of each destination device includes a product of each public key corresponding to each other destination device of the plurality of destination devices raised to a power of the source device private key.

5. The method of claim 4, wherein creating the session key is also based on the source device private key.

6. The method of claim 1, further including creating one or more placeholder public keys, and wherein:
creating the session key is further based on the one or more placeholder public keys.

7. The method of claim 6, wherein creating the plurality of partial keys includes creating one or more partial keys corresponding to the one or more placeholder public keys, communicating the encrypted content material includes communicating the encrypted content material to other receiving devices, and creating the one or more placeholder public keys is dependent upon the other receiving devices.

8. A source device that is configured to encrypt content material for communication to a plurality of destination devices, each destination device of the plurality of destination devices having a private key and a public key of a public-private key pair, the source device comprising:

a key generator that is configured to generate a plurality of keys based on the public keys of the plurality of destination devices, the plurality of keys including:
a session key for encrypting the content material, and
a plurality of partial keys corresponding to the plurality of destination devices, each partial key being configured to provide a decryption key corresponding to the session key when combined with the private key of each corresponding destination device and a public group key, and an encrypter that is configured to encrypt the content material based on the session key to create encrypted content material.

9. The source device of claim 8, further including a transmitter that is configured to communicate the encrypted content material to at least one destination device with at least one partial key that corresponds to the at least one destination device.

10. The source device of claim 9, wherein the session key is further based on a source device private key corresponding to the public group key, and the transmitter is further configured to communicate the public group key to the at least one destination device.

11. The source device of claim 8, wherein the key generator is configured to generate each partial key of each destination device based on a product of each public key corresponding to each other destination device of the plurality of destination devices.

12. The source device of claim 11, wherein each partial key is dependent upon the source device private key.

13. The source device of claim 12, wherein the partial key of each destination device includes a product of each public key corresponding to each other destination device of the plurality of destination devices raised to a power of the source device private key.

14. A method for decrypting encrypted content material from a source device that is encrypted based on a plurality of public keys, the method comprising:

receiving the encrypted content material, receiving a first key that corresponds to a public key that is associated with the source device, receiving a second key that is based on a subset of the plurality of public keys, and creating a decryption key that is based upon the first key, the second key, and a private key of a public-private key pair whose corresponding public key is included in the plurality of public keys and is not included in the subset of the plurality of public keys, and decrypting the encrypted content material based on the decryption key.

15. The method of claim 14, further including:

communicating the corresponding public key of the public-private key pair to facilitate a creation of the second key.

16. The method of claim 14, wherein the decryption key includes a product of the second key and the first key raised to a power of the private key.

17. A destination device comprising a receiver that is configured to receive encrypted content material, a first key, and a second key,
the encrypted content material being encrypted based on a session key that is based on a plurality of public keys,
the first key corresponding to a public group key, and
the second key being based on a subset of the plurality of public keys, a key generator that is configured to create a decryption key based on the first key, the second key, and a private key of a public-private key pair whose corresponding public key is included in the plurality of public keys and is not included in the subset of the plurality of public keys, and a decrypter that is configured to decrypt the encrypted content material based on the decryption key.

18. The destination device of claim 17, further including a transmitter that transmits the public key to facilitate a creation of the session key that is used to encrypt the encrypted content material.

19. The destination device of claim 17, wherein the decryption key includes a product of the second key and the first key raised to a power of the private key.

* * * * *